Figure 1:
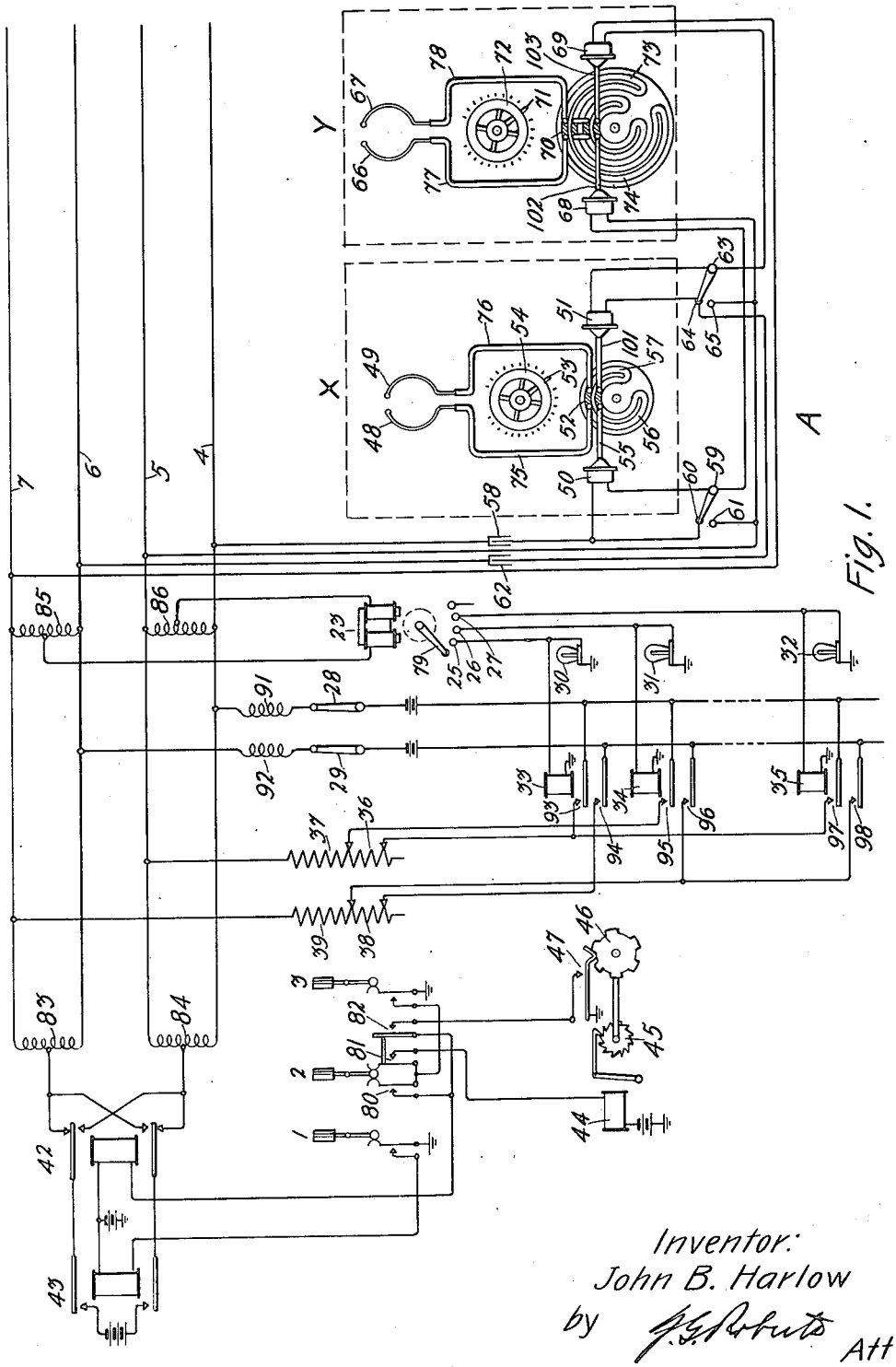

Inventor:
John B. Harlow.
by J.E.Roberts
Att'y.

UNITED STATES PATENT OFFICE.

JOHN B. HARLOW, OF UPPER MONTCLAIR, NEW JERSEY, ASSIGNOR TO WESTERN ELECTRIC COMPANY, INCORPORATED, OF NEW YORK, N. Y., A CORPORATION OF NEW YORK.

SWITCHING SYSTEM.

1,419,561. Specification of Letters Patent. Patented June 13, 1922.

Application filed June 24, 1919. Serial No. 306,407.

*To all whom it may concern:*

Be it known that I, JOHN B. HARLOW, a citizen of the United States, residing at Upper Montclair, in the county of Essex and State of New Jersey, have invented certain new and useful Improvements in Switching Systems, of which the following is a full, clear, concise, and exact description.

This invention relates to switching systems and particularly to such systems employed in detecting the presence of marine or submarine vessels.

In systems of this character, especially in those in which certain areas are provided with a plurality of submerged vibration detectors, each responsive to mechanical vibrations emanating from the submarine or other marine vessel and propagated through the water, the operation of such detectors being selectively observed individually or in binaural pairs at a receiving station, it is desirable to provide means operating synchronously with the individual selecting means to apprise the observer of the selected detectors.

It is also desirable in some instances to provide observer-controlled means for varying the effectiveness of the selecting means upon the selectors.

In some cases, it is of advantage to binaurally observe the response of detectors at different stations of the system as well as of the detectors located at a particular station.

In order to locate a source of vibration with precision, it is essential that the same effect be produced at the observing station when any detector is subjected to a source of virbrations of a definite character and bearing a definite relation to the detector.

It is an object of this invention to provide a system of this character in which a common indicating means operating synchronously with individual switching means for various stations in response to the actuation of the selector control means at an observer's station, positively identifies the selected station, the response of the indicating and individual switching means to an individual actuation of the selector control means being variably controlled by the observer.

It is another object of the invention to provide a system of this nature in which each detector may be selectively paired with another detector at the same station or with a detector at another station.

A further object of the invention is to provide means in a system of this nature to insure the same response of the receiving means from the operation of all detectors in respect to a source of a given character occupying a similar relative position thereto.

To attain these objects, in accordance with one feature of the invention, a system of this character in which an observer's station and a plurality of selectable way stations are interconnected by a phantom circuit, is provided with a master electromechanical device at the observer's station which operates synchronously with individual electromechanical switching devices at the various selectable stations to positively identify the selected station.

In accordance with another feature of the invention, switching means is provided whereby the observer may selectively cause a single or plural response of the various switching devices upon an individual actuation of the selecting or control means. More specifically, means is provided to send either one current impulse or a plurality of current impulses over a circuit including the switching devices, in response to each actuation of the sending or selecting key.

In accordance with a further feature of the invention, the master selector also controls the resistance of the operating circuits of the selected detectors to provide a predetermined current flow in such circuits in each case, irrespective of the location of the selected station.

Figure 2:
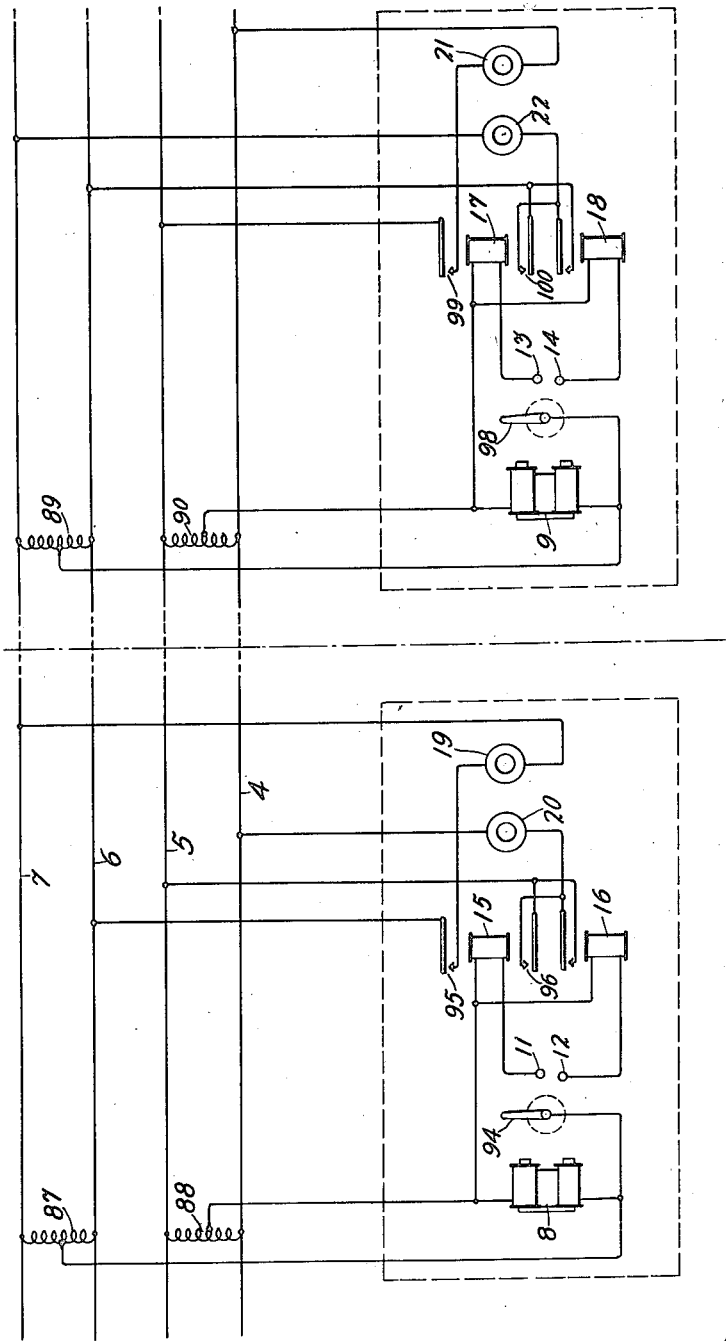

These and other features of the invention will clearly appear from the following specification and the annexed drawings, Figs. 1 and 2 of which, when placed end to end with Fig. 1 at the left, show one embodiment of the invention as applied to a multiple station submarine detection system.

Referring to the drawings, at the observers' station A, which may be located at any suitable point on the shore, there are provided suitable keys 1, 2 and 3 for controlling the application of selecting current to a phantom circuit composed of conductors 4, 5, 6 and 7 simplexed by usual simplexing coils 83 to 90 inclusive, and extending to detecting stations B and C of which there may be a considerable number, only two of such stations being shown for the sake of clearness. At the detecting stations there are associated with the phantom circuit step-by-step switching devices 8 and 9, which may be of any suitable type, responding to current impulses of alternating polarity received over the phantom circuit and which are adapted to selectively close contacts 11, 12, 13 and 14 respectively, upon the receipt of a predetermined series of impulses. The selectively operated circuit controlling device disclosed in Patent No. 1,343,256, granted to Joseph C. Field June 15, 1920, may be used to advantage in this connection when adjusted to be retained in any one of a plurality of selectable positions. The closure of these contacts controls the association of relays 15, 16, 17 and 18 with the phantom circuit for effecting the connection of the detectors 19, 20, 21 and 22 with the physical line or side circuits composed of conductors 4—5 and 6—7. The detectors and the associated station apparatus may be supported upon a tripod or any other suitable submerged framework properly anchored in a substantially fixed position. The detectors may be of any suitable type adapted to vary the electrical characteristics of an associated circuit in response to mechanical vibrations propagated through the water. A master step-by-step selector 23, similar to selectors 8 and 9 except equipped with additional contacts bridged across the phantom circuit at the observer's station A, operates in synchronism with the station selectors, a moving switch arm 79 thereof selectively engaging contacts 25, 26 and 27, to control the detector indicating lamps 30, 31 and 32, and relays 33, 34 and 35 for selectively determining the effectiveness of battery feed resistance units 36, 37, 38 and 39. A battery key 1, a control key 2 and a stepping key 3 cooperate with the stepping magnet 44 and an impulse wheel 46 to control the operation of battery relay 43 and a reversing relay 42 for selectively operating the various selectors over the phantom circuit. Binaural observing and compensating sets X and Y are furnished for use when the observed detectors are located at the same station and at different stations respectively. Set X comprises a pair of receivers 50 and 51 adapted for association with the physical lines 4—5 and 6—7 respectively by means of switches 59 and 63 and from which sounds are carried to earpieces 48 and 49 through variable length air tubes 56 and 57 and fixed length air tubes 55, 75 and 101, 76 respectively. A hand wheel 54 controls the position of the movable stop member 52 which adjusts the relatively effective lengths of the variable air tubes 56 and 57, the position of such stop being indicated by the pointer 53. The set Y differs from set X only in greater lengths of air paths for use with the increased spacing between detectors at different stations.

It is thought that the invention may be more fully comprehended from the following description of the operation of the system shown on the drawing.

Assuming that the observer wishes to determine the location of a source of vibration, the battery supply switches 28 and 29 being closed and the lever of switching or control key 2 occupying a position in which contacts 81 and 82 are closed, the key 1 is actuated, operating battery relay 43 over an obvious circuit to connect a source of selecting current to the phantom circuit through simplexing coils 83 and 84. Succeeding the actuation of key 1 by an interval greater than that separating the closely succeeding selecting impulses, key 3 is actuated, operating stepping relay 44 over a circuit established from battery, through the winding of relay 44, contact 81 of key 2, and the contact of key 3, to ground. The pawl attached to the armature of relay 44 engages the ratchet wheel 45 and causes it to advance the space of one tooth. The impulse wheel 46 rigidly attached to the same shaft as and rotating with the wheel 45 has one-half the number of teeth of the ratchet wheel 45 and is therefore advanced a space of one-half tooth, causing the spring member 47 to close its contact. One reversed current impulse is sent over the phantom circuit and the subsequent release of key 3 causes the release of stepping relay 44, but due to the elevated position of spring 47 on the tooth of the wheel 46, reversing relay 42 is maintained in an operated condition over a circuit extending from battery, through the winding of relay 42, contact 82 of key 2 and the contact of spring 47 to ground. A succeeding actuation of key 3 reoperates stepping relay 44, thereby advancing the ratchet wheel 45 one tooth and impulse wheel 46 one-half tooth, causing the spring 47 to leave the formerly engaged tooth of wheel 46 and to open its contact to release reverse relay 42, thereby transmitting a current impulse of opposite polarity over the phantom circuit. Therefore the succeeding release of key 3, although releasing relay 44, does not affect relay 42. However, the next actuation of key 3 causes a repetition of the series of operations described in connection with the first mentioned actuation of such key to transmit another current impulse of alternate polarity. Thus with the lever of key 2 in position to close contacts 81 and 82, each actuation and the accompanying release of key 3 causes the transmission of a single impulse of current over the phantom circuit, the succeeding impulses of such current being of opposite polarity. In case it is desired to transmit one impulse for each actuation and a second impulse for the subsequent release of key 3, the lever of key 2 is moved to close contact 80. Under these conditions an actuation of key 3 causes the operation of reversing relay 42 over a circuit established from battery, through the winding of relay 42, contact 80 of key 2 and the contact of key 3, to ground. The succeeding release of key 3 releases such relay, thus transmitting an impulse of one polarity in response to the actuation of key 3 and an impulse of the opposite polarity in response to the succeeding release of such key.

However, with either method of operation, the selectors 8, 9 and 23 are advanced one step in response to each impulse of current.

Assuming that it is desired to binaurally observe the operation of detectors 19 and 20 at station B, the stepping key 3 is actuated to transmit the predetermined series of impulses of alternating polarity for causing selector 8 at station B to close its contact 11, no other station selector being adjusted to close its contact in response thereto while selector 8 is individually held with its arm 94 engaging contact 11. Relay 15 is thereupon operated by current flowing through the winding thereof from the phantom circuit, through the switch arm 94 of selector 8 in engagement with contact 11. The closure of contact 95 of relay 15 includes detector 19 in a bridge across conductors 6 and 7, while the closure of contact 96 thereof includes detector 20 in a bridge across conductors 4 and 5. Master selector 23 operates synchronously with the station selector, and the contact arm 79 thereof engages a corresponding one of contacts 25, 26 and 27. Therefore, in response to the series of impulses selecting detectors 19 and 20, selector 23 causes its arm 79 to engage contact 25. The properly designated lamp 30 being lighted thereby, serves to identify the selected pair of detectors. Relay 33 also operated at this time in multiple with lamp 30 supplies operating current for detector 19 over a circuit extending from one side of battery, through contact 94 of relay 33, resistance units 38 and 39 in series, conductor 7, current varying devices of detector 19, contact 95 of relay 15, conductor 6, retardation coil 92, and switch 29, to the other side of battery. The current for detector 20 is supplied over a circuit established from one side of battery through contact 93 of relay 33, resistance units 36 and 37 in series, conductor 5, contact 96 of relay 15, current varying device of detector 20, conductor 4, retardation coil 91, and switch 28 to the other side of battery. The total resistance of units 38 and 39 and of units 36 and 37 permits the proper flow of current through each of the current varying devices of the detectors at station B. Since the listening set X is adapted for use with the spacing of detectors 19 and 20, the switch arms 59 and 63 are placed in engagement with contacts 61 and 65 respectively, to bridge receivers 50 and 51 across the respective pairs of conductors 4—5 and 6—7. The vibrations of detectors 19 and 20 cause a varying current flow through the condensers 58 and 62 and the windings of receivers 50 and 51 respectively, and the sounds produced by such receivers in response thereto are transmitted to the earpieces 48 and 49 through the air tubes 55—56—75 and 101—57—76. The hand wheel 54 is then rotated in the proper direction to shift the position of movable stop member 52 to increase the effective length of one variable air tube and to correspondingly decrease the effective length of the other variable air tube until the observer, upon listening binaurally to the sounds emitted from ear pieces 48 and 49, receives the impression that the source of sound is straight ahead. From the position of the pointer 53 upon the associated scale of the compensating device the observer may then determine the angular relation of such source to the base line joining detectors 19 and 20.

Such position being noted, the observer releases key 1, thereby removing current from the phantom circuit to release all operated selectors and the operated relays associated with selectors 8 and 23, as well as extinguishing lamp 30, thus restoring all apparatus to normal.

Key 1 being actuated, another series of transmitted impulses causes selector 9 to advance its contact arm 98 into engagement with contact 13 connecting relay 17 across the phantom circuit. The consequent operation of such relay upon current flowing between simplexing coils 89 and 90 connects detector 21 across conductors 4 and 5 by the closure of contact 99, and detector 22 across conductors 6 and 7 by the closure of contact 100. No other station selector will close a contact in response to such series. Master selector 23 advances until its contact arm 79 engages contact 26, thereby lighting lamp 31 to indicate that detectors 21 and 22 have been selected. By the coincident operation of relay 34 current is supplied to detector 21 over a circuit established from battery, through contact 95 of relay 34, resistance unit 37, conductor 5, contact 99 of relay 17, current varying device of detector 21, conductor 4, retardation coil 91, and switch 28 to the other side of battery. Current is supplied to detector 22 over a circuit established from battery through contact 96 of relay 34, resistance unit 39, conductor 7, current varying device of detector 22, contact 100 of relay 17, conductor 6, retardation coil 92, and switch 29 to the other side of the battery. The resistance values of units 37 and 39 are chosen to insure the flow of substantially the same amount of current in the operating circuits of detectors 21 and 22 as in the case of detectors 19 and 20. The angular relation of the source of observed vibration to the base line joining detectors 21 and 22 is then determined in the same manner as described for the similarly spaced detectors 19 and 20.

The release of key 1 releases the operated selectors and the associated operated apparatus as before, and thereafter key 1 is actuated and a series of impulses is supplied to the phantom circuit which causes selectors 8 and 9 to simultaneously advance to positions in which contacts 12 and 14 are engaged by contact arms 94 and 98 respectively. Relays 16 and 18 are thereby placed in multiple relation across the phantom circuit. Relay 16 operates upon current flowing between simplexing coils 87 and 88, connecting detector 20 in bridge of conductors 4 and 5, while relay 18 operates upon current flowing between simplexing coils 89 and 90 connecting detector 22 in bridge of conductors 6 and 7. Simultaneously, master selector 23 advances until arm 79 engages contact 27, causing the lighting of lamp 32 and the operation of relay 35. The illumination of the properly designated lamp 32 indicates the selection of a pair composed of detector 20 located at station B and detector 22 located at station C. The operation of relay 35 supplies current to detector 20 over a circuit extending from battery, through contact 97 of relay 35, resistance units 36 and 37 in series, conductor 5, contact of relay 16, current varying device of detector 20, conductor 4, retardation coil 91, and switch 28 to the other side of battery. Current is also supplied to detector 22 over a circuit established from battery, through contact 98 of relay 35, resistance unit 39, conductor 7, current varying device of detector 22, contact of relay 18, conductor 6, retardation coil 92, and switch 29 to the other side of battery.

It will be noted that the resistance values of the units 36 and 37 in series and of the individual unit 36 are such that substantially the same amount of current flows through the operating circuits of detectors 20 and 21, which amount also agrees with that flowing in such circuits in the previous cases in which these detectors were paired with detectors 19 and 22, respectively.

Since the increased spacing of the detectors now under observation requires increased variable length air tubes for proper compensation, switch arms 59 and 63 are moved to engage contacts 60 and 64, thereby substituting receivers 68 and 69 of observation set Y for receivers 50 and 51 in association with the pairs of conductors 4—5 and 6—7 respectively. As described in connection with the former cases, the sounds generated in receivers 68 and 69 in response to current variations caused by the vibrations of detectors 20 and 22 are transmitted to the ear pieces 66 and 67 of the binaural observation set Y, through the tubes 102, 74, 77 and 103, 73, 78 respectively. The observer, listening binaurally to such sounds, rotates hand wheel 72 to shift the movable stop 70 in the proper direction to adjust the variable length air tubes 74 and 73 until it appears that the sound is directly ahead. The position of the pointer 71 relative to the associated scale then indicates the angular relation of the source of vibration to the base line interconnecting detectors 20 and 22.

From a series of observations obtained in this manner through a plurality of stations the location of a source of vibration may be determined with precision.

What is claimed is:

1. In a selective switching system, a phantom circuit having a selecting station and a plurality of selectable stations connected therewith, a selector at each selectable station having a polarized electromagnet responsive to alternating current impulses received over the phantom circuit, a source of direct current, an impulse sending device at the selecting station controlling the connection of the source of current with the phantom circuit, means controlled by the sending device for intermittently reversing the polarity of the source of current during the operation of the sending device, a plurality of telephonic transmitters at each selectable station, means controlled by the selectors for connecting the associated transmitters with the side circuits comprising the phantom circuit and a source of alternating current, and a telephonic receiver associated with each side circuit at the selecting station.

2. In a selective switching system, a phantom circuit having a selecting station and a plurality of selectable stations connected therewith, an electromagnetic step-by-step selector at each selectable station responsive to current impulses received over the phantom circuit, a master electromagnetic step-by-step selector at the selecting station also responsive to such current impulses, means at the selecting station for transmitting current impulses over the phantom circuit to advance any selector into a predetermined position, a plurality of electrical devices at each selectable station, means responsive to the advancement of a selector at any station into its predetermined position to connect one of the electrical devices thereat in bridge of one of the side circuits comprising the phantom circuit, and signaling means controlled by the master selector to indicate the selected electrical device.

3. In a selective switching system, a phantom circuit having a selecting station and a plurality of selectable stations connected therewith, an electromagnetic step-by-step selector at each selectable station responsive to current impulses received over the phantom circuit, a master electromagnetic stepby-step selector at the selecting station also responsive to such current impulses, means at the selecting station for transmitting current impulses over the phantom circuit to advance any selector into a predetermined position, a plurality of electrical devices at each selectable station, means responsive to the advancement of a selector at any station into its predetermined position to connect one of the electrical devices thereat in bridge of one of the side circuits comprising the phantom circuit, another source of current, and means controlled by the master selector interposed between the last mentioned source and the side circuit, a resistance as determined by the selected electrical device.

4. In a selective switching system, a phantom circuit having a selecting station and a plurality of selectable stations connected therewith, an electromagnetic stey-by-step selector at each station responsive to current impulses received over the phantom circuit, means at the selecting station for transmitting current impulses over the phantom circuit to advance any selector into any one of a plurality of predetermined positions, a pair of electrical devices at each selectable station, means at each selectable station responsive to the advancement of the selector to one predetermined position to connect one of the electrical devices to one of the side circuits comprising the phantom circuit, and means also at each selectable station responsive to the advancement of the selector thereat into another predetermined position to connect one of the associated electrical devices to each of the side circuits comprising the phantom circuit.

5. In a selective switching system, a phantom circuit having a selecting station and a plurality of selectable stations connected therewith, an electromagnetic step-by-step selector at each selectable station responsive to current impulses received over the phantom circuit to advance into any one of a plurality of predetermined positions, means at the selecting station for transmitting current impulses over the phantom circuit, a plurality of electrical devices at each selectable station, means at each selectable station responsive to the advancement of the selector thereat into one of its predetermined positions to connect one of the electroresponsive devices to each side circuit comprising the phantom circuit, and means also at each selectable station responsive to the advancement of the selector thereat into another of its predetermined positions to connect a predetermined one of the electrical devices to a predetermined side circuit comprising the phantom circuit.

6. In a selective switching system, a phantom circuit having a selective station and a plurality of selectable stations connected therewith, a plurality of electrical devices at each selectable station, means at the selecting station for transmitting current impulses over the phantom circuit, an electromagnetic step-by-step selector at each station responsive to one series of current impulses received over the phantom circuit to advance individually to one predetermined position to connect one of the associated electrical devices to each side circuit and to another series of impulses received over the phantom circuit to advance to another predetermined position simultaneously with a selector at another selectable station to connect one of the associated electrical devices to one of the side circuits to form a pair with an electrical device simultaneously connected to the other side circuit by the simultaneously operating selector at the other station.

7. In a selective switching system, a phantom circuit having a selecting station and a plurality of selectable stations connected therewith, means at the selecting station for transmitting current impulses over the phantom circuit, a plurality of electrical devices at each selectable station, an electromagnetic step-by-step selector at each station, each of said selectors adapted to be advanced to a plurality of advanced positions and to be individually retained in one such position in response to the receipt of a predetermined series of impulses over the phantom circuit and to be retained in another position simultaneously with another selector in response to another series of impulses, means operated by a selector in its first-mentioned advanced position to connect one of the electrical devices at such station with each of the side circuits comprising the phantom circuit, means operated by one of the selectors in its second-mentioned advanced position to connect one of the associated electrical devices to one side circuit, and means operated by the other selector simultaneously advanced to its second-mentioned position to connect one of the associated electrical devices to the other side circuit.

8. In a selective switching system, a phantom circuit having a selecting station and a plurality of selectable stations connected therewith, means at the selecting station for transmitting current impulses over the phantom circuit, a plurality of electrical divices at each selectable station, an electromagnetic step-by-step selector at each selectable station capable of being advanced in response to current impulses received over the phantom circuit, individually retained in one advanced position and retained in another advanced position simultaneously with a selector at another station, means controlled by a selector in its first-mentioned advanced position to connect one of the associated electrical devices at each side circuit comprising the phantom circuit, means controlled by one selector in its second-mentioned position to connect one of its associated electrical devices to one such side circuit, and means controlled by the other selector simultaneously advanced to its second-mentioned position to connect one of its associated electrical devices to the other such side circuit.

9. In a signaling system, a signaling circuit, a receiving station, a source of current thereat, a plurality of transmitting stations including current varying signal transmitters spaced at various points along the circuit, means responsive to code impulses impressed upon the circuit to selectively associate the signal transmitters with the circuit, and means at the receiving station also responsive to the code impulses to interpose between the circuit and the source of current, a resistance inversely proportional to the resistance of the signal circuit between the selected transmitting and the receiving station.

10. In a signaling system, a signaling circuit, a receiving station including a signal receiver, a source of current thereat, a plurality of transmitting stations including current varying signal transmitters spaced at various points along the circuit, means responsive to code impulses impressed upon the circuit to selectively associate the signal transmitters with the circuit, and means at the receiving station also responsive to the code impulses to interpose between the circuit and the source of current a resistance to compensate for the variations in the resistance of the signal circuit.

In witness whereof, I hereunto subscribe my name this 17th day of June A. D., 1919.

JOHN B. HARLOW.